United States Patent
Jong et al.

(10) Patent No.: US 10,282,085 B2
(45) Date of Patent: May 7, 2019

(54) METHOD FOR DISPLAYING DATA AND ELECTRONIC DEVICE THEREOF

(71) Applicant: Samsung Electronics Co., Ltd., Gyeonggi-do (KR)

(72) Inventors: In-Won Jong, Seoul (KR); You-Jin Im, Seoul (KR); Hye-Bin Park, Seoul (KR); Joo-Hyung Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 412 days.

(21) Appl. No.: 14/334,119

(22) Filed: Jul. 17, 2014

(65) Prior Publication Data

US 2015/0067614 A1 Mar. 5, 2015

(30) Foreign Application Priority Data

Aug. 27, 2013 (KR) .................. 10-2013-0101809

(51) Int. Cl.
| | | |
|---|---|---|
| *G06F 3/048* | (2013.01) | |
| *G06F 3/0481* | (2013.01) | |
| *G06F 3/0488* | (2013.01) | |
| *G06F 3/0484* | (2013.01) | |
| *G06F 3/0483* | (2013.01) | |
| *G06F 3/0482* | (2013.01) | |
| *G09G 5/14* | (2006.01) | |

(52) U.S. Cl.
CPC ........ *G06F 3/04883* (2013.01); *G06F 3/0483* (2013.01); *G06F 3/04817* (2013.01); *G06F 3/04842* (2013.01); *G06F 3/0481* (2013.01); *G06F 3/0482* (2013.01); *G06F 3/0488* (2013.01); *G09G 5/14* (2013.01)

(58) Field of Classification Search
CPC .. G06F 3/04883; G06F 3/0483; G06F 3/0481; G06F 3/0488; G06F 3/0482; G06F 3/04842; G06F 3/04817; G06F 3/0484; G09G 5/14
See application file for complete search history.

(56) References Cited

U.S. PATENT DOCUMENTS

| | | | |
|---|---|---|---|
| 9,152,235 B2 * | 10/2015 | Wardenaar | ............. G11B 27/34 |
| 2010/0083190 A1 * | 4/2010 | Roberts | ............... G06F 3/04883 |
| | | | 715/863 |
| 2011/0199318 A1 * | 8/2011 | Fong | ..................... G06F 3/0485 |
| | | | 345/173 |
| 2011/0202834 A1 | 8/2011 | Mandryk et al. | |
| 2012/0071208 A1 * | 3/2012 | Lee | ................... H04M 1/72544 |
| | | | 455/566 |

(Continued)

FOREIGN PATENT DOCUMENTS

| | | |
|---|---|---|
| JP | 2013182528 | 9/2013 |
| KR | 1020120069373 | 6/2012 |
| KR | 1020130091181 | 8/2013 |

*Primary Examiner* — Tuyetlien T Tran
(74) *Attorney, Agent, or Firm* — The Farrell Law Firm, P.C.

(57) ABSTRACT

A method of displaying data and an electronic device thereof are provided. The method includes receiving a first gesture input when a first program is displayed on a first layer of a touch screen of the electronic device, displaying a second program corresponding to the first gesture input on a second layer of the touch screen, receiving a second gesture input on the second layer, and displaying a third program corresponding to the second gesture input on a third layer of the touch screen.

12 Claims, 14 Drawing Sheets

(56) References Cited

U.S. PATENT DOCUMENTS

| | | | |
|---|---|---|---|
| 2012/0235912 A1* | 9/2012 | Laubach | G06F 3/04895 345/163 |
| 2012/0304132 A1* | 11/2012 | Sareen | G06F 3/04883 715/863 |
| 2012/0326989 A1 | 12/2012 | Verthein et al. | |
| 2013/0174179 A1* | 7/2013 | Park | G06F 9/4843 718/107 |
| 2014/0173721 A1* | 6/2014 | Shenfield | G06F 3/0488 726/21 |
| 2014/0282214 A1* | 9/2014 | Shirzadi | G06F 3/04883 715/781 |

* cited by examiner

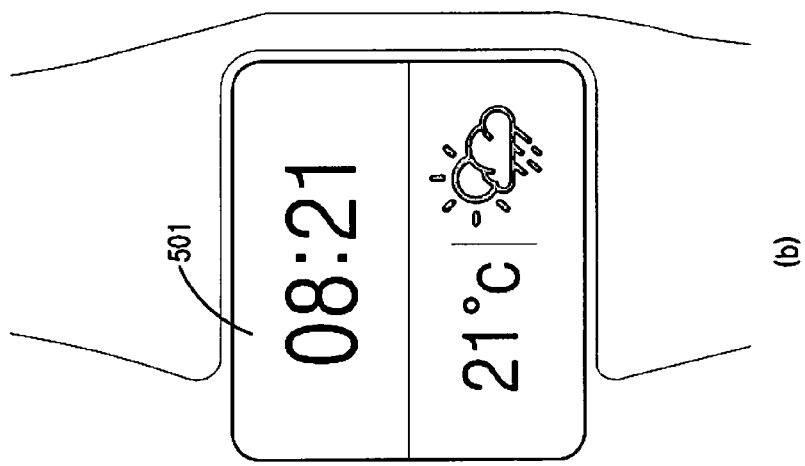
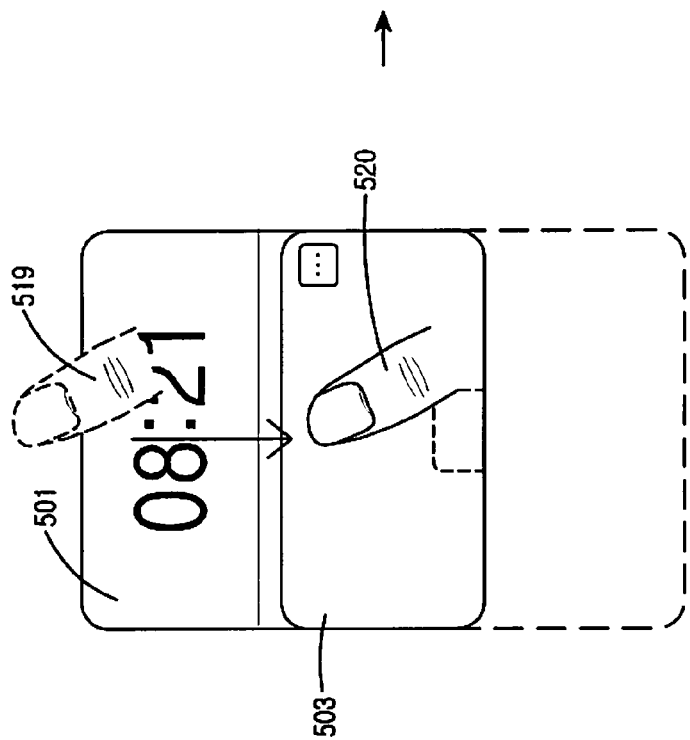
FIG.5C

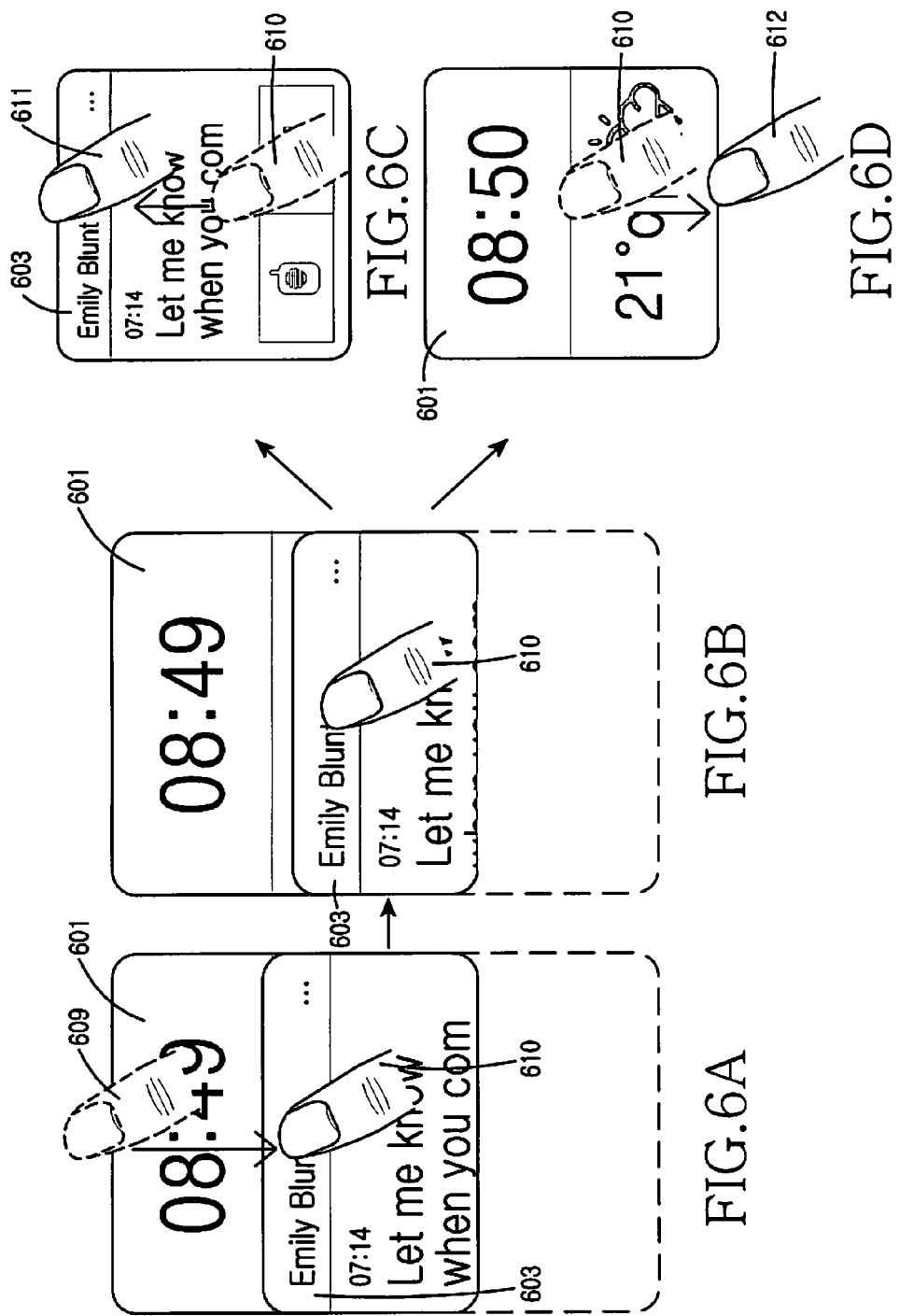

METHOD FOR DISPLAYING DATA AND ELECTRONIC DEVICE THEREOF

PRIORITY

This application claims priority under 35 U.S.C. § 119(a) to a Korean Patent Application filed in the Korean Intellectual Property Office on Aug. 27, 2013 and assigned Serial No. 10-2013-0101809, the entire disclosure of which is incorporated herein by reference.

BACKGROUND OF THE INVENTION

1. Field of the Invention

The present invention generally relates to a method of displaying data and an electronic device thereof.

2. Description of the Related Art

Recently, electronic devices have mainly used a touch screen, in which input and output are simultaneously generated, as a data input means. The touch screen may display various information. If a user of the electronic device performs a touch on the displayed information, a function of the electronic device is processed corresponding to the touch of the user.

When displaying feedback corresponding to an input gesture on the touch screen, the electronic device displays the feedback on a certain region of the touch screen or displays the feedback in a notification window on a layer which is different from a layer previously displayed on the touch screen.

When displaying an operation of the electronic device, the electronic device may execute one or more programs and their functions on a layer displayed on the touch screen and output the functions without being displayed.

As electronic devices become more and more miniaturized, wearable electronic devices are being developed. In case of a touch screen included in a miniaturized electronic device, when displaying feedback corresponding to gesture input, there is a limit in applying various effects, which are included in the conventional touch screen, to the touch screen of the miniaturized electronic device.

SUMMARY OF THE INVENTION

The present invention has been made to address at least the above problems and disadvantages, and to provide at least the advantages described below. Accordingly, an aspect of the present invention is to provide a method of displaying feedback corresponding to a gesture input to a touch screen in an electronic device and the electronic device thereof.

Another aspect of the present invention is to provide a method of displaying an operation performed in an electronic device and the electronic device thereof.

Another aspect of the present invention is to provide a method of using a layer applied to a touch screen in an electronic device and the electronic device thereof.

In accordance with an aspect of the present invention, a method of an electronic device is provided. The method includes receiving a first gesture input when a first program is displayed on a first layer of a touch screen of the electronic device, displaying a second program corresponding to the first gesture input on a second layer of the touch screen, receiving a second gesture input on the second layer, and displaying a third program corresponding to the second gesture input on a third layer of the touch screen.

In accordance with another aspect of the present invention, an electronic device is provided. The electronic device includes a touch screen for displaying one or more layers, a memory for storing information about the one or more layers in the electronic device, and at least one processor for processing information about the one or more layers, wherein the processor receives first gesture input when a first program is displayed on a first layer of the touch screen, displays a second program corresponding to the first gesture input on a second layer of the touch screen, receives second gesture input on the second layer, and displays a third program corresponding to the second gesture input on a third layer of the touch screen.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIGS. 5A to 5C(b) illustrate a process of releasing a display of a layer displayed on a touch screen in an electronic device according to an embodiment of the present invention;

FIGS. 6A to 6D illustrate a process of controlling a display of a layer displayed on a touch screen in an electronic device according to an embodiment of the present invention;

DETAILED DESCRIPTION OF EMBODIMENTS OF THE PRESENT INVENTION

Various embodiments of the present invention will be described herein below with reference to the accompanying drawings. In the following description, well-known functions or constructions are not described in detail since they may obscure the invention in unnecessary detail.

In describing various embodiments of the present invention, a description will be given for a touch screen which may perform an input process through an input device and a display process through a display unit on one physical screen. Accordingly, although the display unit and the input device are separately included in the electronic device, the display unit may include the input device or the input device may be the display unit.

Various embodiments of the present invention may be applied to at least one of various electronic devices, in which the display unit and the input device are physically separated, or including only one of the display unit and the input device without being limited to only the electronic device including the touch screen. Hereinafter, in accordance with various embodiments of the present invention, a device having a touch screen may be an electronic device including a touch screen which includes a display and a touch input device, a display unit which does not include a touch input device, or a display unit including a touch input device.

Hereinafter, the electronic device includes at least one of a mobile communication user device, a Personal Digital Assistant (PDA), a Personal Computer (PC), a laptop computer, a smart phone, a smart TV, a netbook, a Mobile Internet Device (MID), an Ultra Mobile PC (UMPC), a tablet PC, a mobile pad, a media player, a handheld computer, a navigation device, a smart watch, a Head Mounted Display (HMD), and a Moving Picture Experts Group (MPEG) layer 3 (MP3) player.

Hereinafter, in a detailed description for one embodiment of the present invention, when it is described that any component is "connected" or "accessed" to another component, it will be understood that the any component may be directly connected or accessed to the another component, but there may be another component between the any component and the another component. On the other hand, when it is described that any component is "directly connected" or "directly accessed" to another component, it will be understood that there is no another component between the any component and the another component.

Figure 1:
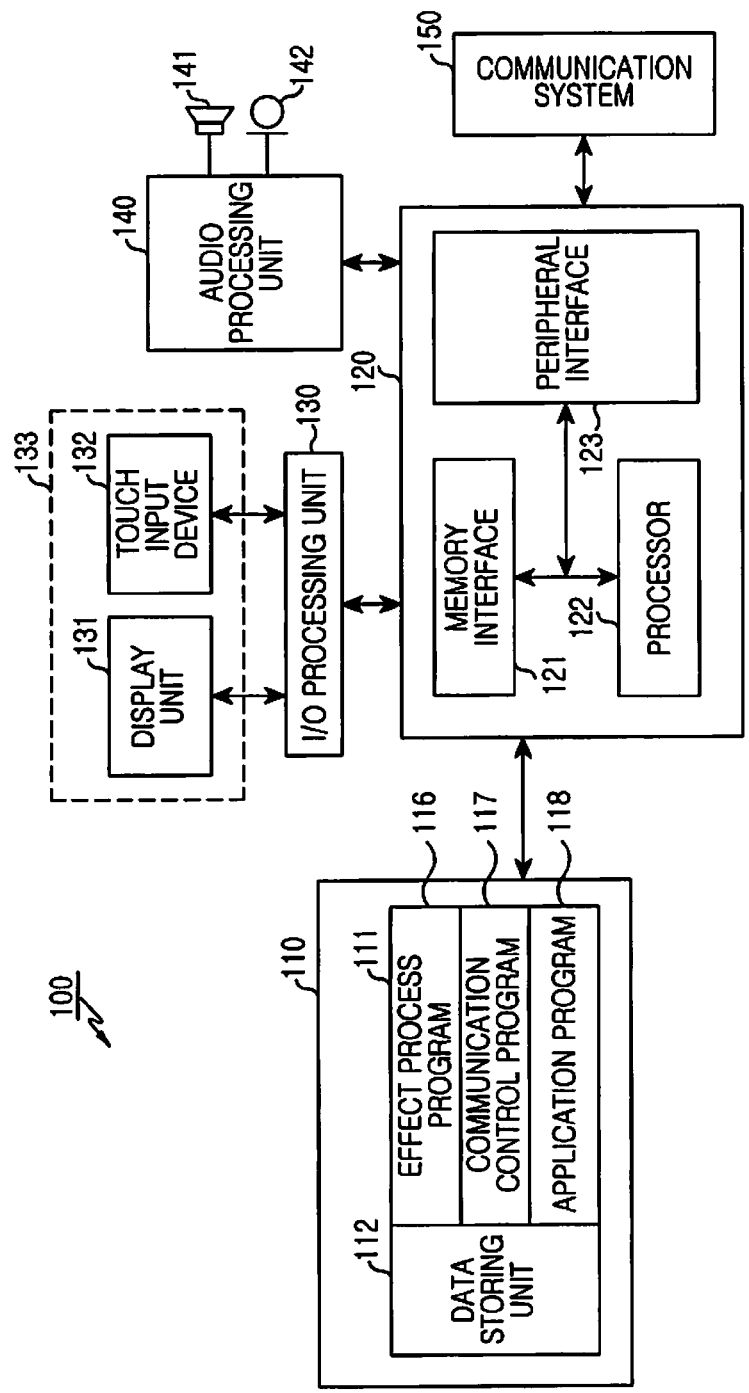
FIG. 1 is a block diagram illustrating a configuration of an electronic device according to an embodiment of the present invention.

FIG. 1 is a block diagram illustrating a configuration of an electronic device according to an embodiment of the present invention.

As shown in FIG. 1, the electronic device 100 includes a memory 110 and a processor unit 120. Also, the electronic device 100 may include an Input/Output (I/O) processing unit 130, an I/O device 133, that is, a touch screen 133 including a display unit 131 and a touch input device 132, an audio processing unit 140, and a communication system 150, which are peripherals, and other peripherals.

The memory 110 includes a program storing unit 111 for storing programs for controlling operations of the electronic device 100 and a data storing unit 112 for storing data generated while the programs are executed. The memory 110 may store data generated in programs by an operation of the processor 122, etc. In accordance with an embodiment of the present invention, the data storing unit 112 may store a database of a table or list type by previously determined operation information for controlling another electronic device and configuring the database of the table or list type at the electronic device 100.

The program storing unit 111 includes an effect process program 16, a communication control program 117, and at least one application program 118. Herein, the programs included in the program storing unit 111 may be expressed in an instruction set as a set of instructions.

The application program 118 may include a software component for at least one application program installed in the memory 110 of the electronic device 100.

The effect process program 116 may control a layer displayed on the touch screen 133 in response to a gesture or motion to the touch screen 133. In accordance with an embodiment of the present invention, when an input gesture corresponds to an operation displayed on a new layer, the electronic device 100 may display an operation corresponding to the input gesture on a second layer which is different from a first layer previously displayed on the touch screen 133 and control the touch screen 133 to display the second layer like being piled up on the first layer previously displayed on the touch screen 113.

The effect process program 116 may release a display of a layer displayed on the touch screen 133 in response to a gesture or motion input to the touch screen 133. In accordance with an embodiment of the present invention, when an input gesture corresponds to releasing a display of a layer displayed on the touch screen 133, the electronic device 100 may release the display of the layer by removing the layer displayed on the touch screen 133. The electronic device 100 may control the display unit 133 to display a layer previously underneath the removed layer on the touch screen 133.

The effect process program 116 may control the touch screen 133 to display feedback according to a gesture input to the touch screen 133. In accordance with an embodiment of the present invention, when a touch input is sensed, the effect process program 116 may control the touch screen 133 to display a visual effect of reducing a predetermined size of a display based on the touch-input position or the touch-input layer, at a predetermined rate. In accordance with an embodiment of the present invention, when a touch input is sensed and lasts for a predetermined time or longer, the effect process program 116 may control the touch screen 133 to display a visual effect for gradually reducing a reduced predetermined size of a display or the touch-input layer.

The communication control program 117 may include at least one software component for controlling communication with at least one another electronic device using the communication system 150 or a local-area wireless communication module. In accordance with an embodiment of the present invention, the communication control program 117 may search a counterpart electronic device for performing communication. If the counterpart electronic device for performing communication is found, the communication control program 117 may set connection for communication with the counterpart electronic device. Thereafter, the communication control program 117 may control the communication system 150 to perform a performance search and session establishment procedure with the connected counterpart communication device and transmit and receive data (e.g., packet data) with the counterpart electronic device.

The memory 110 included in the electronic device 100 may be one or more memories. In accordance with an embodiment of the present invention, the memory 110 may only perform a function of the program storing unit 111, only perform a function of the data storing unit 112, and perform the functions of both of the program storing unit 111 and the data storing unit 112. The memory 110 may not be accurately partitioned in its internal physical region due to characteristics of the electronic device 100.

The processor unit 120 includes a memory interface 121, at least one processor 122, and a peripheral interface 123. Herein, the memory interface 121, the at least one processor 122, and the peripheral interface 123 may be integrated in at least one Integrated Circuit (IC) or be separately implemented.

The memory interface 121 may control a component like the processor 122 or the peripheral interface 123 to access the memory 110.

The peripheral interface 123 controls connection among an I/O peripheral of the electronic device 100, the processor 122, and the memory interface 121.

The processor 122 performs a control operation to provide a variety of multimedia services to the electronic device 100 using at least one software program. The processor 122 displays a User Interface (UI) operation of the electronic device 100 on the display unit 131 and uses the I/O processing unit 130 to verify the GUI operation of the electronic device 100. The processor 122 may control the touch input device 132 to provide a service in which it receives an instruction from the outside of the electronic device 100 through the touch input device 132. The processor 122 may perform a control operation to execute at least one program stored in the memory 110 and provide a service according to the corresponding program.

The I/O processing unit 130 provides an interface between I/O devices, such as the display device 131 and the touch input device 132, and the peripheral interface 123.

The display unit 131 receives state information of the electronic device 100, characters input from the outside of the electronic device 100, and video images such as moving pictures and still pictures from the processor unit 120 and display the received data.

The touch input device 132 provides input data generated by selection of the user to the processor unit 120 through the I/O processing unit 130. In accordance with an embodiment of the present invention, the touch input device 132 may include only a control button for receiving control data from the outside of the electronic device 100, or may be a keypad.

In accordance with an embodiment of the present invention, the touch input device 132 may be included together with the display unit 131 in the I/O device 133 to perform I/O on one screen. In this case, the touch input device 132 included in the I/O device 133 may operate according to one or more of a capacitive type, a resistive (pressure sensing) type, an infrared type, an electromagnetic induction type, and an ultrasonic type.

In accordance with an embodiment of the present invention, an input type of the touch input device 132 may be a type in which the touch input device 132 receives a command when an input means is located within a certain distance from the touch screen 133, in addition to a type in which the touch input device 132 receives a command when the touch screen 133 is directly touched. The input type of the touch input device 132 may be referred to as a hovering touch type, a floating touch type, an indirect touch type, a proximity touch type, or a non-contact input type.

The I/O device 133 is a device in which the touch input device 132 is physically combined to the display unit 131 in one screen. As described above, the I/O device 133 may be the touch screen which receives a command when a screen displayed on the display unit 131 is touched for an operation of the electronic device 100. The touch screen plays a role in all functions of the display unit 131 which displays a UI operation of the electronic device 100 and the touch input device 132 which provides an external command to the electronic device 100. Therefore, the touch screen may be referred to as the touch screen 133 including the display unit 131 and the touch input device 132. Hereinafter, a description will be given for the touch screen 133 including a complex touch panel in which a touch panel and a pen touch panel are implemented together. The touch screen 133 of the electronic device 100 may be not limited to the touch screen including the complex touch panel, and may be a touch screen including a pen touch panel which may recognize only a pen touch.

The audio processing unit 133 provides an audio interface between the user and the electronic device 100 through a speaker 141 and a microphone 142.

The communication system 150 performs a communication function. In accordance with an embodiment of the present invention, the communication system 150 may perform communication with a counterpart electronic device using one or more of mobile communication through a base station, wired communication, and satellite communication.

The communication system 150 may connect with a local-area wireless communication module and perform local-area wireless communication.

In accordance with an embodiment of the present invention, the local-area wireless communication module may perform communication with a counterpart electronic device using at least one of local-area wireless communication such as infrared communication, Bluetooth communication, Bluetooth Low Energy (BLE) communication (a type of Bluetooth communication), Wireless-Fidelity (Wi-Fi) communication, Near Field Communication (NFC), Zigbee communication, Ultra Wide Band (UWB) communication, and wireless Local Area Network (LAN) communication, and wired communication. In accordance with an embodiment of the present invention, the communication system 150 and the local-area wireless communication module are configured separately. However, the communication system 150 and the local-area wireless communication module may perform communication in one communication system module. In describing various embodiments of the present invention, an infrared communication module and a local-area wireless communication module may be configured separately.

Although it is not shown in FIG. 1, one or more programs or one or more components of the electronic device may perform their operations by one or more control modules controlled by the processor 122.

In describing an embodiment of the present invention, the term "display" on the electronic device 100 or "output" to the electronic device 100 may indicate a method of displaying moving pictures, still pictures, or GUI operations on the touch screen 133 of the electronic device 100 or a method of outputting tones or voice audios to the speaker 141, respectively. Hereinafter, a description will be given for the term "display" or "output" in the above-described meaning. If it is necessary to classify the two terms "display" and "output", "display" and "output" may be separately described.

In describing various embodiments of the present invention, the electronic device 100 may play a role in functions of one or more counterpart electronic devices (e.g., a first electronic device, a second electronic device, or a third electronic device, etc). In accordance with various embodiments of the present invention, the one or more counterpart electronic devices (e.g., a first electronic device, a second electronic device, or a third electronic device, etc) are the same as the electronic device 100 or similar to the electronic device 100. Also, the one or more counterpart electronic devices (e.g., a first electronic device, a second electronic device, or a third electronic device, etc) may include some of the electronic device 100.

Figure 2A:
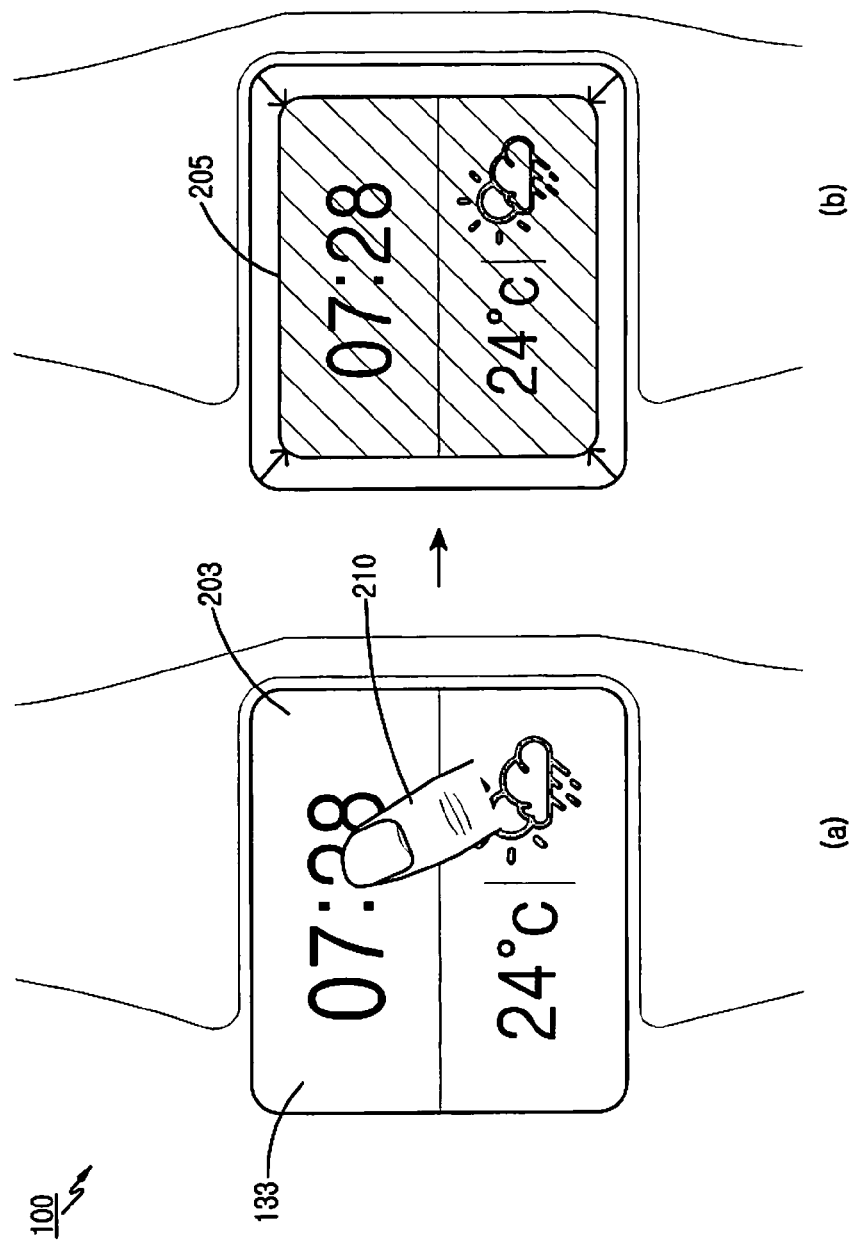
FIGS. 2A(a) to 2B(b) illustrate a process of displaying a layer on a touch screen in an electronic device according to an embodiment of the present invention.
Figure 2B:
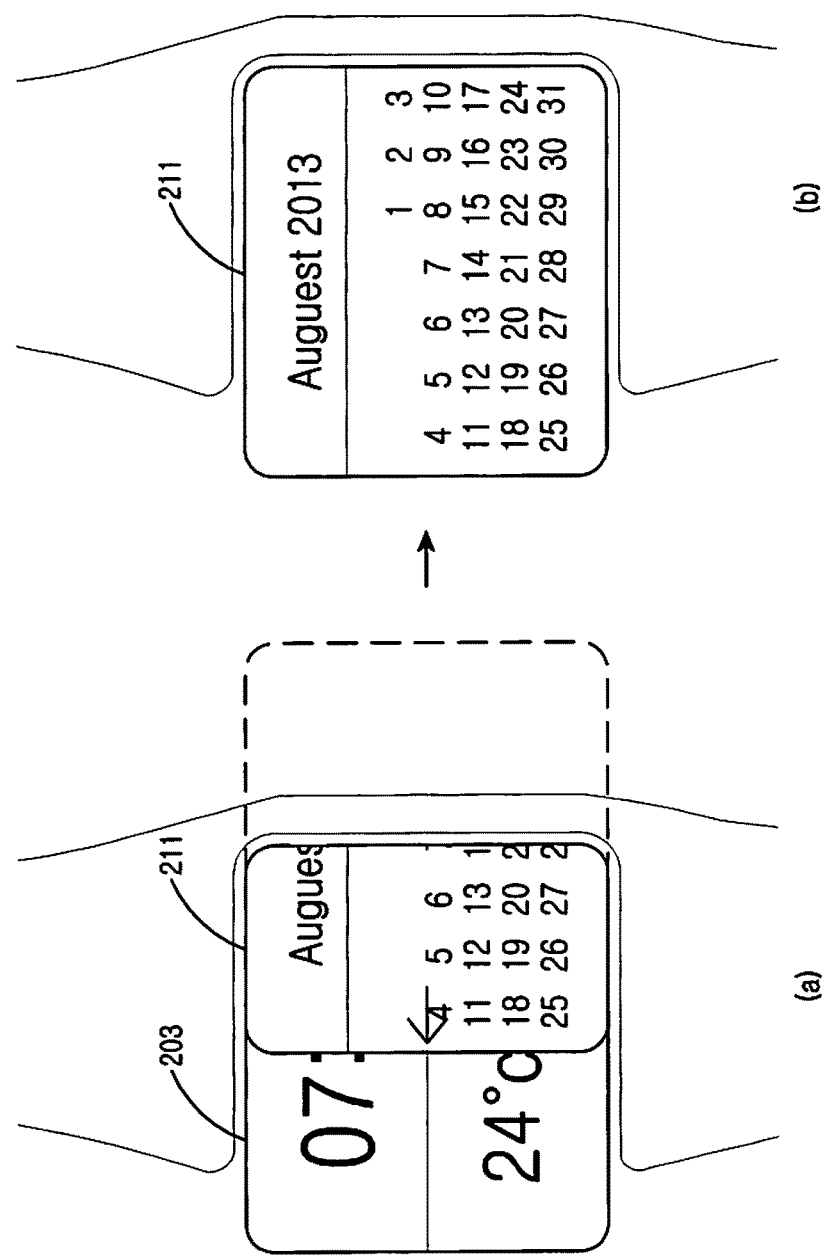

FIGS. 2A to 2B illustrate a process of displaying a layer on a touch screen in an electronic device according to an embodiment of the present invention.

Referring to FIGS. 1 and 2A(a), the electronic device 100 has the touch screen 133 on a front surface of its body and includes a touch button (not shown) on a predetermined position of the touch screen 133. The electronic device 133 may include a physical button (not shown) in a front, side, or rear surface of the body or a predetermined position of an auxiliary device. In accordance with an embodiment of the present invention, when the electronic device 100 is an electronic device of a wearable watch type, the auxiliary device may be connected by one or more straps and include one or more buttons (touch buttons or physical buttons) on the straps. The straps may be connected to a buckle.

Hereinafter, a description will be given for various embodiments of the present invention with reference to FIGS. 1, 2A(a), and 2A(b).

Referring to FIGS. 1 and 2A(a), the electronic device 100 allows its user to select an object displayed on the touch screen 133 through a gesture such as a touch or hovering and performs a function corresponding to the selected object. The electronic device 100 displays an object on one or more predetermined regions of the touch screen 133. If the displayed object is selected, the electronic device 100 performs a function corresponding to the selected object. In accordance with an embodiment of the present invention, the electronic device 100 displays today's information on the touch screen 133. The electronic device 100 displays an object indicating a time on an upper end region, an object indicating a temperature on a left lower end region, and an object indicating a weather on a right lower end region. The electronic device 100 displays the today's information on one layer. Hereinafter, the electronic device 100 displays the today's information on a today's information layer 203. A user of the electronic device 100 selects the object indicating the time (210).

Referring to FIGS. 1 and 2A(b), when the object displayed on the touch screen 133 is selected, the electronic device 100 outputs feedback for an operation corresponding to selecting the displayed object on the touch screen 133. In accordance with an embodiment of the present invention, the electronic device 100 allows the user to select an object indicating a time displayed on an upper end region of the touch screen 133 through a touch gesture. The electronic device 100 displays feedback corresponding to a selected operation on the touch screen 133 like an effect of pushing all of the today's information layer 203 displayed on the touch screen 133 or at least one (the object indicating the time displayed on the upper end region) of the objects displayed on the today's information layer 203. In accordance with an embodiment of the present invention, assuming that the entire screen of the touch screen 133 is 100%, for outputting the effect of pushing the layer displayed on the touch screen 133 in response to the touch gesture, the electronic device 100 reduces a size of the today's information layer 203 to a size of 95% and displays the reduced today's information layer 205. The electronic device 100 outputs a size-reducing operation as a continuous operation by applying a moving animation effect. The electronic device 100 may additionally apply effects, such as an effect of shading in a color of a displayed region or an effect of gradational displaying, etc., to the size-reduced today's information layer 205 to show an effect of pushing all or a part of a selected object.

Hereinafter, a description will be given for various embodiments of the present invention with reference to FIGS. 1, 2B(a), and 2B(b).

Referring to FIGS. 1 and 2B(a), displaying a program on the touch screen 133, the electronic device 100 generates a new layer which displays information about the program and displays the new layer by piling up the new layer on a layer which displays information about a current program. In accordance with an embodiment of the present invention, the electronic device 100 allows the user to select an object (or a region displaying the object) indicating time displayed on an upper end of the touch screen 133 and displays a calendar program linked to the selected object. In a method of displaying the calendar program, the electronic device 100 generates a new layer and displays the calendar program on the new layer. The electronic device 100 displays a calendar program layer (hereinafter referred to as a calendar layer) by piling up the calendar layer displaying the calendar program on the today's information layer displayed on the touch screen 133. The electronic device 100 outputs an operation piling up a new layer on an old layer as a continuous operation by applying a moving animation effect.

Referring to FIGS. 1 and 2B(b), the electronic device 100 piles up a new layer on a layer displayed on the touch screen 133 and operates its function on the new layer. In accordance with an embodiment of the present invention, the electronic device 100 piles up or covers over the today's information layer 203 on a previously displayed calendar layer 211 of the touch screen 133. Also, the electronic device 100 stores layer information about the above-described today's information layer 203 and the calendar layer 211 temporarily or permanently in the memory 110 and outputs the previously displayed layer (e.g., the today's information layer) through a predetermined gesture or motion, etc.

Figure 3A:
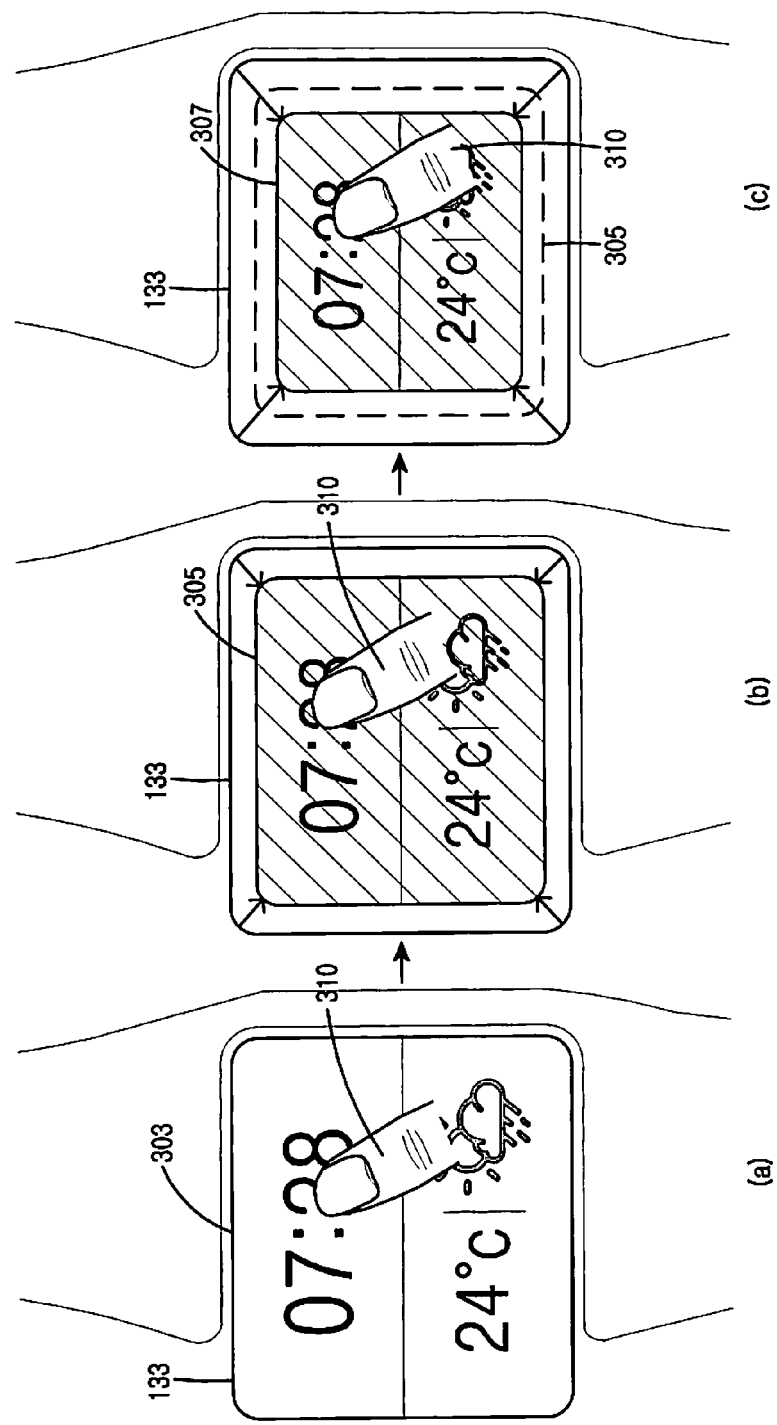
FIGS. 3A(a) to 3B(b) illustrate a process of displaying a layer on a touch screen in an electronic device according to an embodiment of the present invention.

FIGS. 3A(a) to 3B(b) illustrate a process of displaying a layer on a touch screen in an electronic device according to an embodiment of the present invention.

Hereinafter, a description will be given for various embodiments of the present invention with reference to FIGS. 1 and 3A(a) to 3A(c).

Referring to FIGS. 1 and 3A(a), the electronic device 100 allows the user to select an object displayed on the touch screen 133 through a gesture like a touch or hovering and performs a function corresponding to the selected object. The electronic device 100 is not be limited to displaying feedback corresponding to an operation to select one or more objects of a layer displayed on the touch screen 133 through the touch or hovering operation shown in FIGS. 2A(a) to 2B(b), and may display feedback of a touch or hovering operation not to select one or more objects of the layer. In accordance with an embodiment of the present invention, the electronic device 100 allows the user to touch or hover over a predetermined position of a layer displayed on the touch screen 133 through an input means.

Referring to FIGS. 1 and 3A(b), a touch or hovering operation detected by the electronic device 100 may be an operation 310 of continuously holding a touch or hovering over a predetermined object to select a function linked with the predetermined object displayed on the layer 303. Also, the touch or hovering operation detected by the electronic device 100 may be an operation 310 of continuously holding a touch or hovering over a certain region on the touch screen 133. After sensing the operation 310 of continuously holding the touch or hovering over the certain region of the touch screen 133, the electronic device 100 outputs, as shown in FIGS. 2B(a) and 2B(b), an effect 305 (or 205 of FIG. 2A(b)) of pushing the layer 303 displayed on the touch screen 133. If a predetermined function like a touch release in outputting the effect of pushing the displayed layer 303 is not performed, the electronic device 100 does not perform a function corresponding to its selection operation.

Referring to FIGS. 1 and 3A(c), when detecting the operation 310 of holding a touch or hovering over a certain region of the touch screen 133 for a predetermined time or longer, the electronic device 100 performs a corresponding operation. While the electronic device 100 holds a state where a certain region of the touch screen 133 is touched or hovered over for a predetermined time or more, and displays an operation 307 of continuously reducing the layer 305 displayed on the touch screen 133. In accordance with an embodiment of the present invention, when a touch or hovering over a certain region of the touch screen 133 is held for a predetermined time or longer, and an effect of pushing the certain region through the touch or hovering operation has already applied, the electronic device 100 applies an effect of further pushing the layer 305. In accordance with an embodiment of the present invention, when the touch or hovering over the previously pushed layer 305 (e.g., a layer reduced and displayed at 95%) is held for a predetermined time or longer, the electronic device 100 outputs an operation for further reducing the layer 305 to 95%. The electronic device 100 applies and outputs a moving animation effect of gradually reducing the layer 305 to 95%. When outputting the animation effect of gradually reducing the displayed layer, the electronic device may additionally apply a shading effect, a gradation effect, and etc.

In accordance with an embodiment of the present invention, when a touch or hovering over a predetermined region of the touch screen 133 is held for a predetermined time (e.g., 0.5 seconds), the electronic device 100 outputs an animation effect of gradually reducing a layer of a pushed state (e.g., a state where it is reduced at 95%)

Hereinafter, a description will be given for various embodiments of the present invention with reference to FIGS. 1, 3B(a), and 3B(b).

Figure 3B:
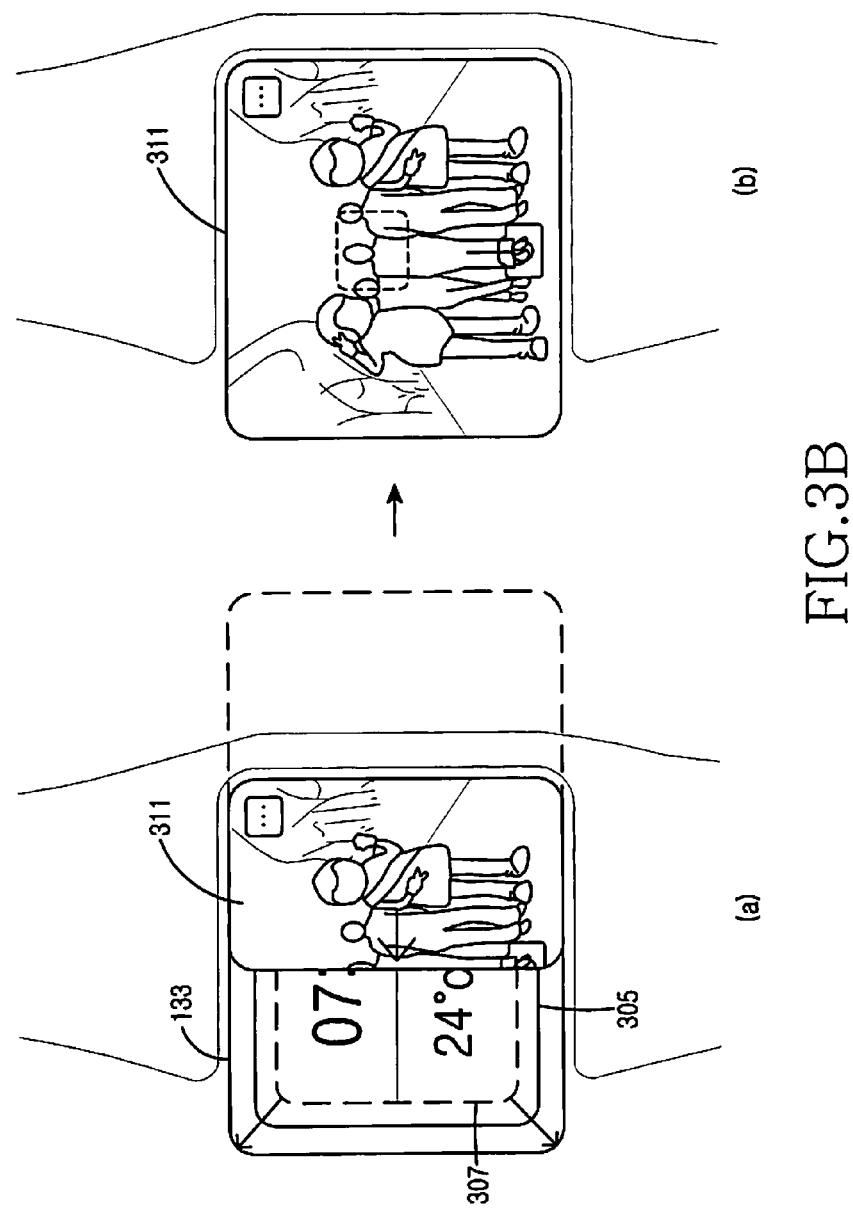

Referring to FIGS. 1 and 3B(a), when displaying a program on the touch screen 133, the electronic device 100 generates a new layer which displays information about the program and displays the new layer by piling up or covering the new layer over a layer which displays information about a current program. In accordance with an embodiment of the present invention, when a predetermined condition is satisfied while outputting an animation effect of gradually reducing a layer of a pushed state, the electronic device 100 displays a corresponding predetermined program. In accordance with an embodiment of the present invention, the predetermined condition is set such as a lapse of one second after the output of the animation effect of gradually reducing the layer of the pushed state. When the predetermined condition is satisfied, the electronic device 100 displays a linked function. The linked function may be an operation which displays a new program. In accordance with an embodiment of the present invention, the electronic device 100 displays a camera program by the linked function. As shown in FIGS. 2B(a) and 2B(b), the electronic device 100 generates the new layer and displays the camera program on the generated new layer. The electronic device 100 displays a camera program layer (hereinafter referred to as a camera layer) 311 which displays the camera program by piling up the camera layer 311 over the today's information layer 307 in a reduced state which is previously displayed on the touch screen 133. The electronic device 100 outputs an operation for piling up the camera layer 311 over the old layer as a continuous operation by applying a moving animation effect. In accordance with an embodiment of the present invention, the electronic device 100 displays an operation for restoring the today's information layer 307 of the reduced state while displaying the effect of piling up the camera layer 311.

Referring to FIGS. 1 and 3B(b), the electronic device 100 may pile up a new layer over a layer previously displayed on the touch screen 133 and operates its function on the new layer. In accordance with an embodiment of the present invention, the electronic device 100 piles up or cover the new camera layer 311 over the today's information layer 203 previously displayed on the touch screen 133, which is pushed (e.g., a reduced state) or restored to the original. Also, the electronic device 100 temporarily or permanently stores layer information (e.g., the layer information of the reduced or restored state) about the above-described today's information layer and layer information about the camera layer 311 in the memory 110 and outputs a previously displayed layer (e.g., the today's information layer) through a predetermined gesture or motion, etc.

Figure 4A:
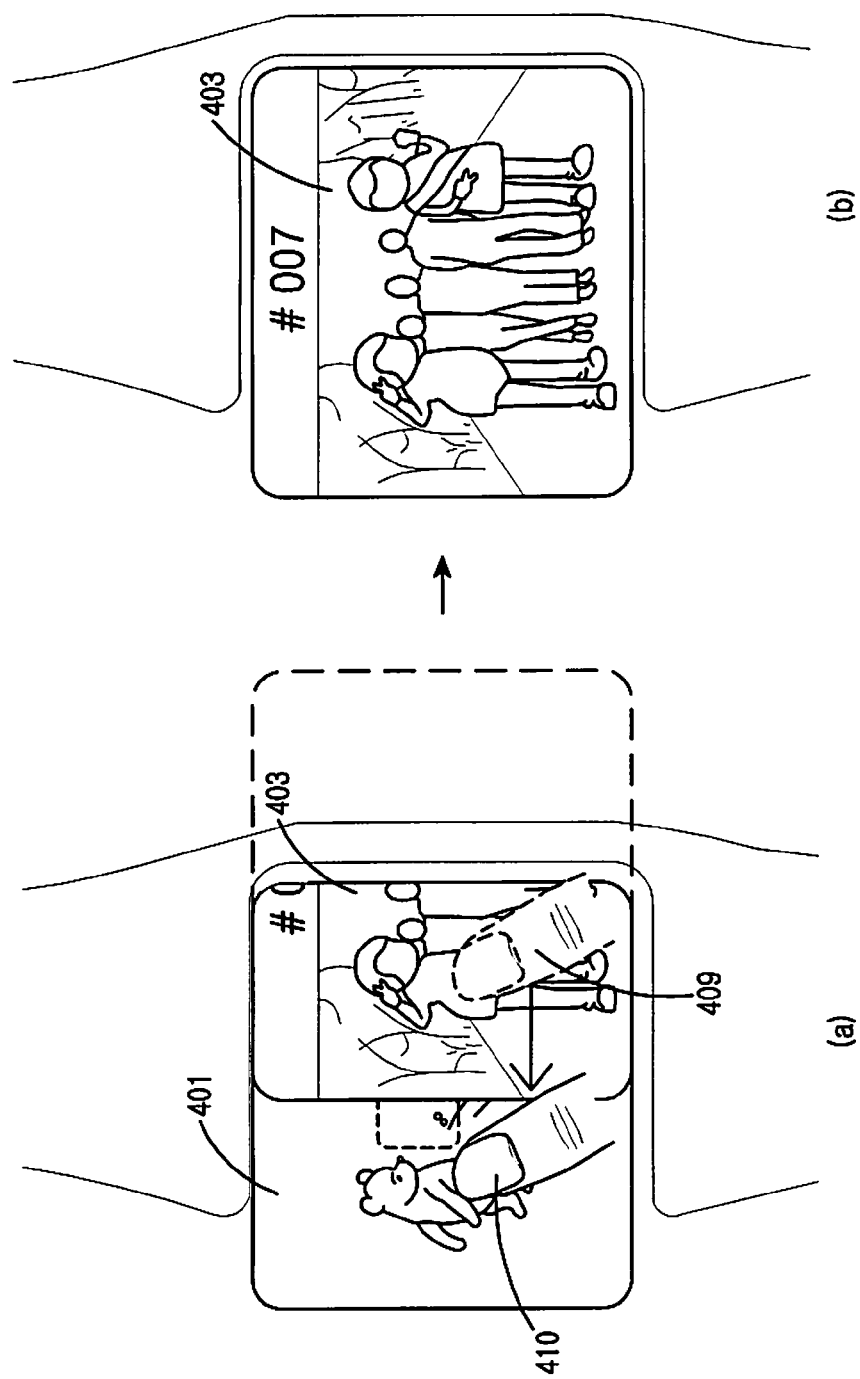
FIGS. 4A(a) to 4B(b) illustrate a process of displaying a layer on a touch screen in an electronic device according to an embodiment of the present invention.

FIGS. 4A(a) to 4B(b) illustrate a process of displaying a layer on a touch screen in an electronic device according to an embodiment of the present invention.

Hereinafter, a description will be given for various embodiments of the present invention with reference to FIGS. 1 and 4A(a) to 4B(b).

Referring to FIGS. 1 and 4A(a), the electronic device 100 allows the user to perform a predetermined gesture or motion on a layer which displays a program through the touch screen 133 and displays its function corresponding to the predetermined gesture or motion on a new layer. The electronic device 100 detects input of a predetermined gesture when a camera layer 401 is displayed on the touch screen 133 and performs a function corresponding to the predetermined gesture. In accordance with an embodiment of the present invention, the electronic device 100 performs a touch 409 of a certain region of the touch screen 133, performs a predetermined gesture such as a drag and touch release 410 in a left direction, and performs an operation for displaying a gallery program corresponding to the performed predetermined gesture on the camera layer 401. For displaying the gallery program, as described in the above-described method, the electronic device 100 displays an animation effect by generating a new layer and piling up a gallery program layer (hereinafter referred to as a gallery layer) 403 over an old layer (e.g., a camera layer).

Referring to FIGS. 1 and 4A(b), the electronic device 100 piles up a new layer over a layer previously displayed on the touch screen 133 and operates its function on the new layer. In accordance with an embodiment of the present invention, when displaying the gallery layer 403 corresponding to a predetermined gesture when the above-described camera layer 401 is displayed on the today's information layer 203, the electronic device 100 temporarily or permanently stores layer information about the above-described today's information layer 303 of FIG. 3A(a), the camera layer 311 of FIG. 3B(a), and the gallery layer 403 and outputs a previous layer (e.g., a camera layer) through the predetermined gesture or motion, etc.

Hereinafter, a description will be given for various embodiments of the present invention with reference to FIGS. 1, 4B(a), and 4B(b).

Figure 4B:
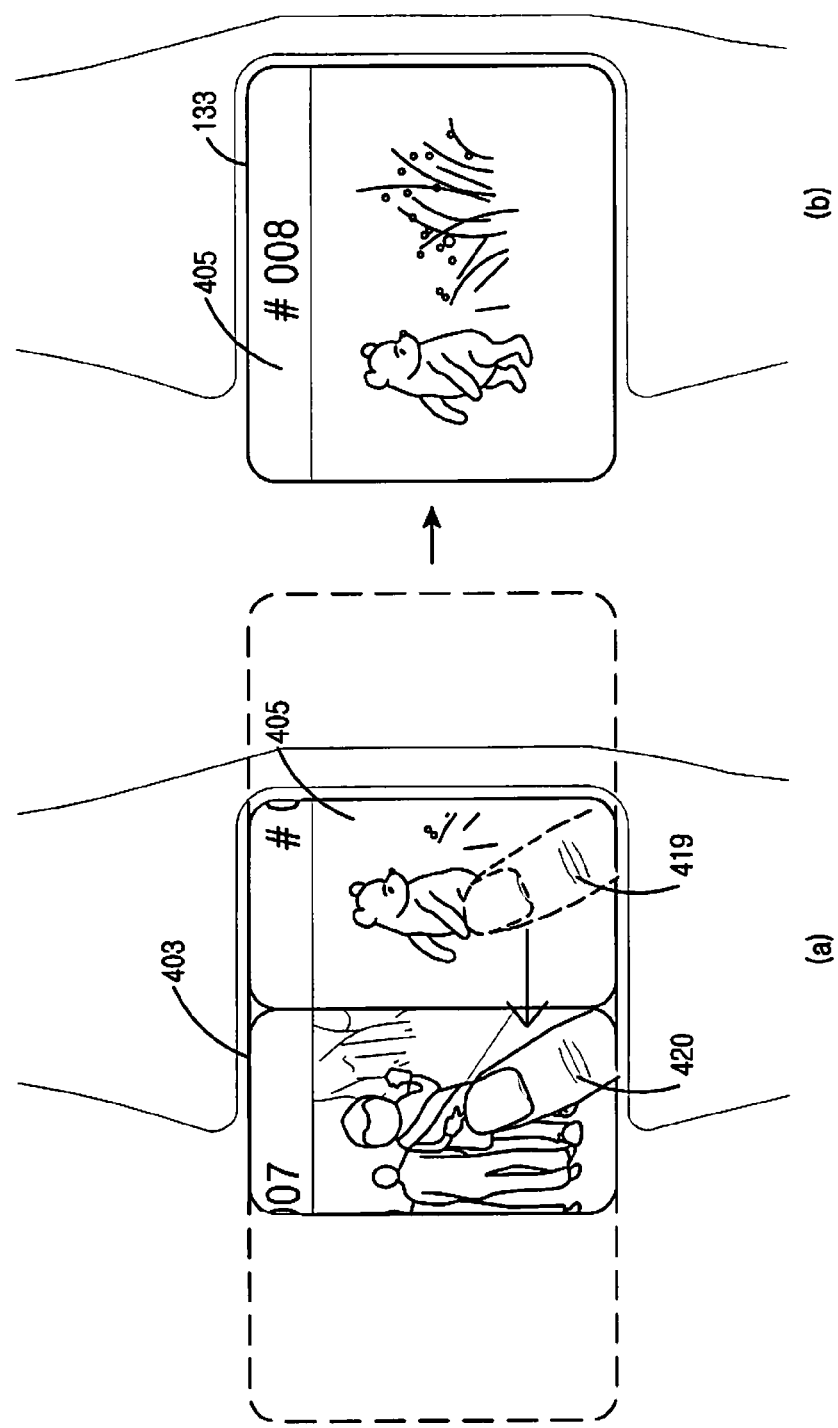

Referring to FIGS. 1 and 4B(a), the electronic device 100 performs its function on the same layer. In accordance with an embodiment of the present invention, as shown in FIG. 4A(b), the electronic device 100 displays one image (an image of a #007 name) on the gallery layer 403. The electronic device 100 detects input of a predetermined gesture when the image of the "#007" name is displayed and performs a function corresponding to the predetermined gesture. In accordance with an embodiment of the present invention, the electronic device 100 performs a touch 419 of a certain region of the touch screen 133, performs a predetermined gesture like a drag and touch release 420 in a left direction while holding the touch 419, and performs an operation for displaying a next image (#008) 405 corresponding to the performed predetermined gesture on the same gallery layer 403. For displaying the gallery program, the electronic device 100 displays the gallery program according to a moving animation effect of a type (e.g., a slide type) of pushing the previously displayed image of the "#007" name and locating the gallery program on a region where the image of the "#007" name of the same layer (e.g., the gallery layer) is pushed.

Referring to FIGS. 1 and 4B(b), the electronic device 100 displays a corresponding image on the same layer as a layer which displays a previous image and uses a function of the gallery program. In accordance with an embodiment of the present invention, the electronic device 100 performs the touch 419 of the certain region of the touch screen 133 and repeatedly performs the predetermined gesture like the drag and touch release 420 in the left direction while holding the touch 419. When there is an image (e.g., an image of a "#009" name) stored (or photographed) after the displayed image of the "#008" name, the electronic device 100 displays the image of the "#009" name on the same layer as the gallery layer 403. In accordance with an embodiment of the present invention, the electronic device 100 performs a touch of a certain region of the touch screen 133 when the image 405 of the "#008" name is displayed and performs a predetermined gesture like a drag and touch release in a right direction while holding the touch. The electronic device 100 displays the image of the "#007" name, which is stored before the displayed image of the "#008" name, in response to the performed predetermined gesture on the same layer as the gallery layer 403.

Referring to FIGS. 4A(a) to 4B(b), when a function of the electronic device 100 is performed through the same gesture, the electronic device 100 displays the function on the new layer or the old layer according to a predetermined condition. In accordance with an embodiment of the present invention, when displaying a new program which is different from a program previously displayed on the touch screen 133, the electronic device 100 displays the new program on the new layer. When displaying a different image on an image displayed on the gallery program, which is data of the same or similar type, the electronic device 100 displays the data on the same layer.

Figure 5A:
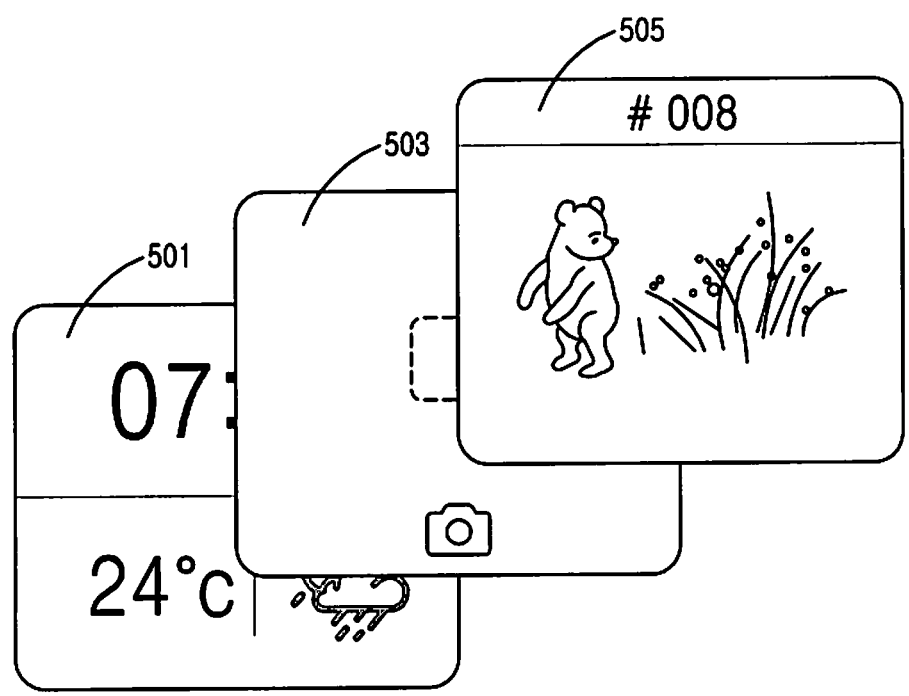
Figure 5B:
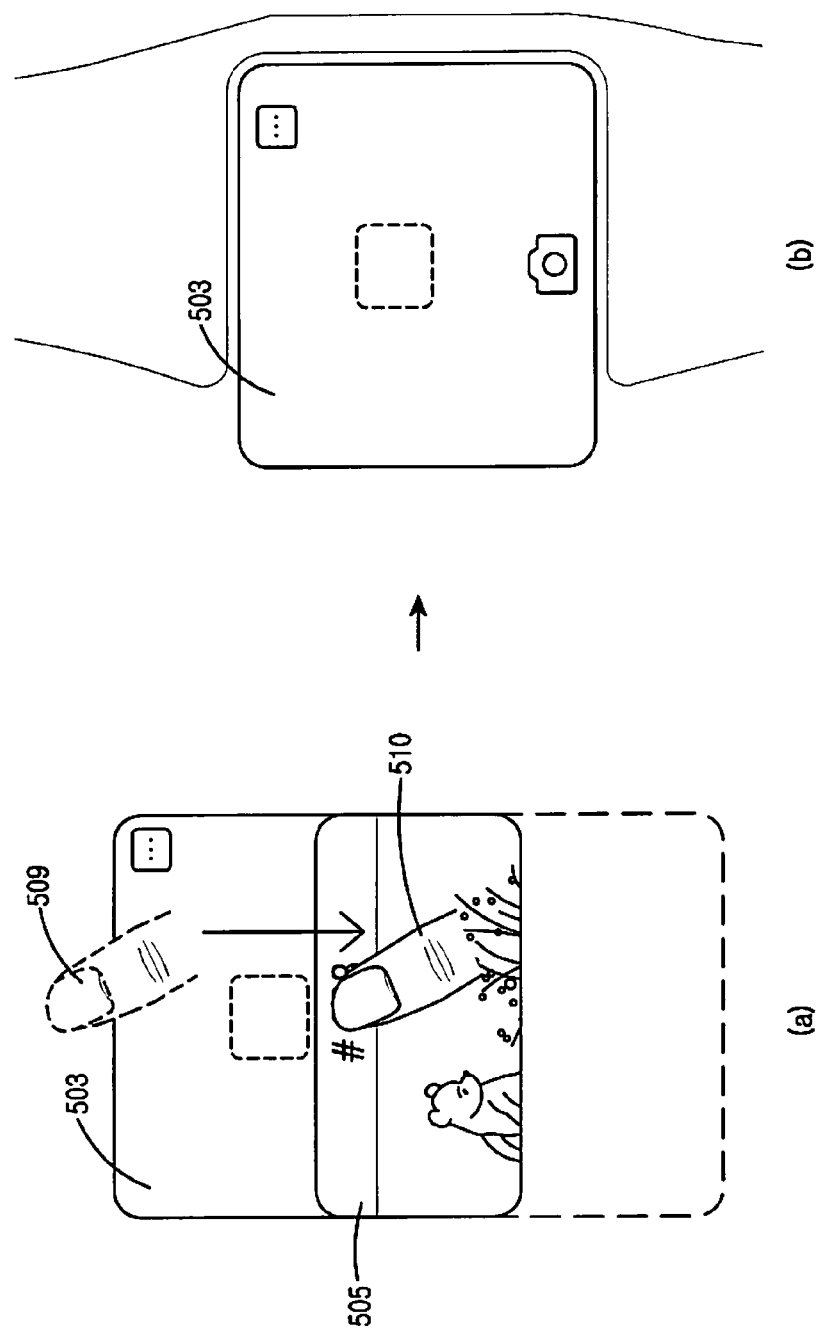

FIGS. 5A to 5C(b) illustrate a process of releasing a display of a layer displayed on a touch screen in an electronic device according to an embodiment of the present invention.

The electronic device 100 releases a display of one or more layers displayed on the touch screen 133 through a predetermined gesture. In accordance with an embodiment of the present invention, the predetermined gesture for releasing the display of the layer may be a bezel sweep operation of performing a drag from the outside (or a circumferential area) of the touch screen 133 to the inside of the touch screen 133. If the bezel sweep operation is input, the electronic device 100 senses an operation of performing a sweep in a center direction from an outermost circumferential area of the touch screen 133, where the touch screen 133 senses a touch or hovering. The operation of performing the sweep is detected as the same or similar operation to a drag and touch release operation while releasing a touch after performing the touch of the touch screen 133. When input is through the hovering, the operation of performing the sweep is detected as the same or similar operation to a movement and selection release operation while holding a selection after performing the selection of a certain region through the hovering. An operation of sensing a sweep started from the outside (or a circumferential area) of the touch screen 133 may be the same or similar operations input by various methods without being limiting to the above-described method.

Hereinafter, a description will be given for various embodiments with reference to FIGS. 1 and 5A.

Referring to FIGS. 1 and 5A, for displaying an operation of the electronic device 100 on the touch screen 133, the electronic device 100 displays one program operation on one layer and displays a new layer by piling up the new layer over an old layer. In accordance with an embodiment of the present invention, the electronic device 100 displays today's information program on a first layer 501. The electronic device 100 performs an operation for displaying a camera program when the today's information program is displayed on the first layer 501. The electronic device 100 generates a second layer 503 and displays the camera program on the generated second layer 503. The electronic device 100 performs an operation of displaying a gallery program when the camera program is displayed on the second layer 503. The electronic device 100 generates a third layer 505 and displays the gallery program on the generated third layer 505. In accordance with an embodiment of the present invention, as described above, for displaying a function of the electronic device 100, the electronic device 100 displays a new layer by generating the new layer when a display of a previously displayed layer is not released and piling up the new layer on the old layer. In accordance with an embodiment of the present invention, the electronic device 100 changes a display order (or an order of a displayed layer) of a layer which displays a called program without being limited to being displayed on a layer generated according to an order calling the program.

Hereinafter, a description will be given for various embodiments with reference to FIGS. 1, 5B(a), and 5B(b).

Referring to FIGS. 1 and 5B(a), if a user of the electronic device 100 performs a predetermined or motion, the electronic device 100 releases a display of a program displayed on the touch screen 133. For releasing the display of the program, the electronic device 100 releases the display of a layer and the display of the program displayed on the layer by an operation of stripping away a layer displayed on the touch screen 133. In accordance with an embodiment of the present invention, referring to FIG. 5A, the electronic device 100 displays the gallery program and an image of a "#008" name on the third layer 505 of the touch screen 133. The electronic device 100 senses input of a bezel sweep operation in a center direction from a circumferential area of the touch screen 133. In accordance with an embodiment of the input bezel sweep, the bezel sweep is an operation of performing a touch 509 in an upper circumferential area of the touch screen 133 of the electronic device 100 and performing a drag and touch release 510 in a lower direction of the touch screen 133 while holding the touch 509. When detecting a predetermined gesture from a sensed operation, the electronic device 100 releases the display of the third layer 505 and the display of the gallery program displayed on the third layer 505 by applying a moving animation effect of stripping away the third layer 505 in a lower direction according to a corresponding operation. In accordance with an embodiment of the present invention, the electronic device 100 displays the second layer 503 displayed before displaying the third layer 505 on the touch screen 133 and a part of a camera program displayed on the second layer 503 in the operation of releasing the display of the third layer 505 in the lower direction.

Referring to FIGS. 1 and 5B(b), when the operation of releasing the display of the third layer 505 is completed, the electronic device 100 displays the old second layer displayed before displaying the third layer 505 and the camera program displayed on the second layer 503. The electronic device 100 performs a function of the displayed camera program.

Hereinafter, a description will be given for various embodiments with reference to FIGS. 1, 5C(a), and 5C(b).

Referring to FIGS. 1 and 5C(a), the electronic device 100 repeatedly performs a predetermined gesture or motion and releases a display of a program displayed on the touch screen 133. For releasing the display of the program, the electronic device 100 releases a display of a layer and a display of a program displayed on the layer by an operation of stripping away the layer displayed on the touch screen 133. In accordance with an embodiment of the present invention, referring to FIG. 5A, the electronic device 100 displays an operation of the camera program on the second layer of the touch screen 133 when the display of the third layer 505 is released. The electronic device 100 senses input of a bezel sweep operation in a center direction from a circumferential area of the touch screen 133. In accordance with an embodiment of the input bezel sweep operation, the bezel sweep operation is an operation of repeatedly performing a touch 519 in an upper circumferential area of the touch screen 133, which is input to release the display of the third layer 505 displayed on the touch screen 133 of the electronic device 100, and performing a drag and touch release 520 in a lower direction of the touch screen 133 while holding the touch 519. When detecting a predetermined gesture from a sensed operation, the electronic device 100 releases the display of the second layer 503 and the display of the camera program displayed on the second layer 503 by applying a moving animation effect of stripping away the second layer 503 in a lower direction by a corresponding operation. In accordance with an embodiment of the present invention, the electronic device 100 displays the first layer displayed before displaying the second layer 503 on the touch screen 133 and a part of the today's information program displayed on the first layer 501 in the operation of releasing the display of the second layer 503 in the lower direction.

Referring to FIGS. 1 and 5C(b), when the operation for releasing the display of the second layer 503 is completed, the electronic device 100 displays the old first layer 501 displayed before displaying the second layer 503 and the today's information program displayed on the first layer 501 and performs a function of the today's information program.

A description will be given for an embodiment of the present invention, which is different to embodiments of FIGS. 5B(a) to 5C(b).

If the user of the electronic device 100 inputs a predetermined gesture or motion to the touch screen 133, the electronic device 100 displays the first layer 501 on the touch screen 133. In accordance with an embodiment of the present invention, if the user performs the above-described bezel sweep operation (519 and 520 of FIG. 5C(a)) once and repeatedly performs it within a predetermined time on the touch screen 133, referring to FIG. 5A, the electronic device 100 simultaneously releases the display of the third layer 505 and the second layer 503. The electronic device 100 releases the display of the third layer 505 and the second 503 by applying a moving animation effect to the third layer 505 and the second layer 503 at the same time or one after the other. The electronic device 100 displays the first layer and a part of the today's information program displayed on the first layer 501 in the operation for releasing the display of the third layer 505 and the second layer 503. When the operation for releasing the display of the third layer 505 and the second layer 503 is completed, the electronic device 100 displays the old first layer 501 displayed before displaying the second layer 503 and the today's information program displayed on the first layer 501 and performs a function of the today's information program. If the user performs the above-described bezel sweep operation once and repeatedly perform it within a predetermined time, layers which are greater than the third layer 505 are generated and displayed without being limited to the operation for displaying the third layer 505 and the second layer 503, and the electronic device 100 performs an operation for releasing the display of the other layers except for the first layer 501. As described above, the electronic device 100 performs the operation for releasing the display of the layer displayed on the touch screen 133 by a feedback operation corresponding to the predetermined gesture or motion.

FIGS. 6A to 6D illustrate a process of controlling a display of a layer displayed on a touch screen in an electronic device according to an embodiment of the present invention.

In accordance with an embodiment of the present invention, if the user performs the bezel sweep operation, the electronic device 100 completes a release of a display of a layer which has already been started or cancels a display release operation.

Referring to FIGS. 1 and 6A, the electronic device 100 displays an audio information program on a first layer 601 and displays a message program on a second layer 603. The electronic device 100 detects a touch 609 and a drag 610 which are input from a circumferential area of the touch screen 133 and performs an operation of stripping away the second layer 603. When an operation of releasing a display of a layer and a display of a program displayed on the layer is designated to be performed in a lower direction of the touch screen 133 from an upper side of the touch screen 133, the electronic device 100 moves, as shown in FIG. 6A, the second layer 603 in the lower direction. The electronic device 100 displays the first layer 601 and a partial area of today's information program displayed on the first layer 601 on a partial area of the touch screen 133, which is displayed by moving the second layer 603 piled up and displayed on the first layer 601.

Referring to FIGS. 1 and 6B, the electronic device 100 controls the display of the second layer 603 when a display release operation of the second layer 603 has been started by the touch 609 and the drag 610 and hold an input means without releasing the touch. In accordance with an embodiment of the present invention, if the user performs a predetermined gesture such as a bezel sweep operation for releasing the display of the displayed layer, a display release operation of the second layer 603 is started. When the user releases a touch of an input means which has been held in the bezel sweep operation, the electronic device 100 performs to complete a display release operation of a corresponding layer and displays a layer which was previously displayed after a display release operation by a set operation. When the user does not release the touch of the input means while the bezel sweep operation, the electronic device 100 controls the second layer 603 of a display release operation by dragging the input means.

Referring to FIGS. 1 and 6C, the electronic device 100 displays a layer which is being controlled on the touch screen 133 by performing an operation in opposite direction of the bezel sweep operation performed in FIG. 6A. In accordance with an embodiment of the present invention, after the user performs the touch 609 on an upper circumferential area of the touch screen 133 and the drag 610 in a lower direction of the touch screen 133, the electronic device 100 controls the second layer 603 when the touch is held without being released. The electronic device 100 controls an area which displays the second layer 603 on the touch screen 133 according to the drags performed by the user through an input means. When the user performs a drag and touch release 611 in an upper circumferential direction of the touch screen 133, which has been started, the electronic device 100 displays the second layer 603 which is being controlled in response to the entire region of the touch screen 133.

Referring to FIGS. 1 and 6D, if the user performs a touch release operation, the electronic device 100 releases a display of a layer, which is being controlled, on the touch screen 133. In accordance with an embodiment of the present invention, after the user performs the touch 609 on an upper circumferential area of the touch screen 133 and the drag 610 in a lower direction of the touch screen 133, the electronic device 100 controls the second layer 603 when the touch is held without being released. The electronic device 100 controls an area which displays the second layer 603 on the touch screen 133 according to the drag performed by the user through an input means. When the user performs a touch release of the input means which has been held or performs a drag and touch release 612 in a lower direction based on an upper side of the touch screen 133 dragged in FIG. 6A, the electronic device 100 releases the display of the second layer 603, which is being controlled, in response to the entire region of the touch screen 133. If the display of the second layer 603 is released, the electronic device 100 displays the first layer 601 displayed before displaying the second layer 603 and the today's information program in response to the entire area of the touch screen 133.

Figure 7A:
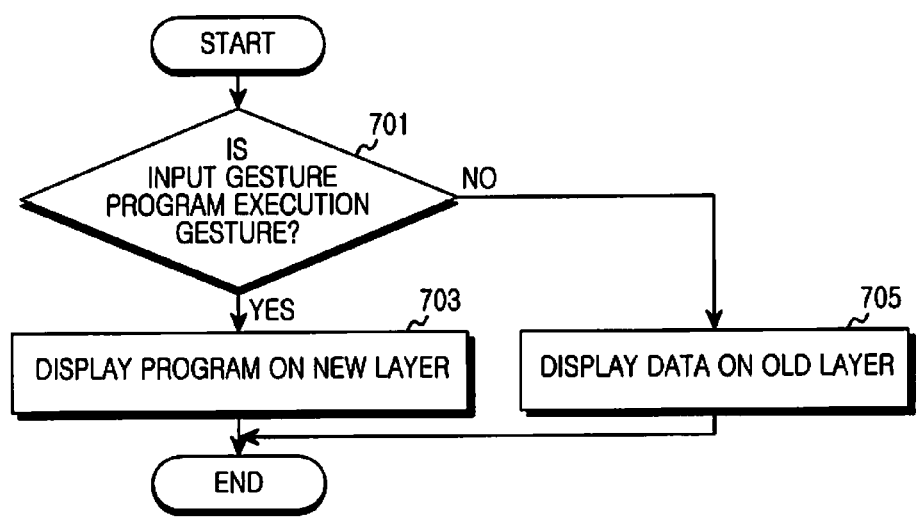
FIGS. 7A and 7B are flowcharts illustrating a process of displaying a layer on a touch screen in an electronic device according to an embodiment of the present invention.
Figure 7B:
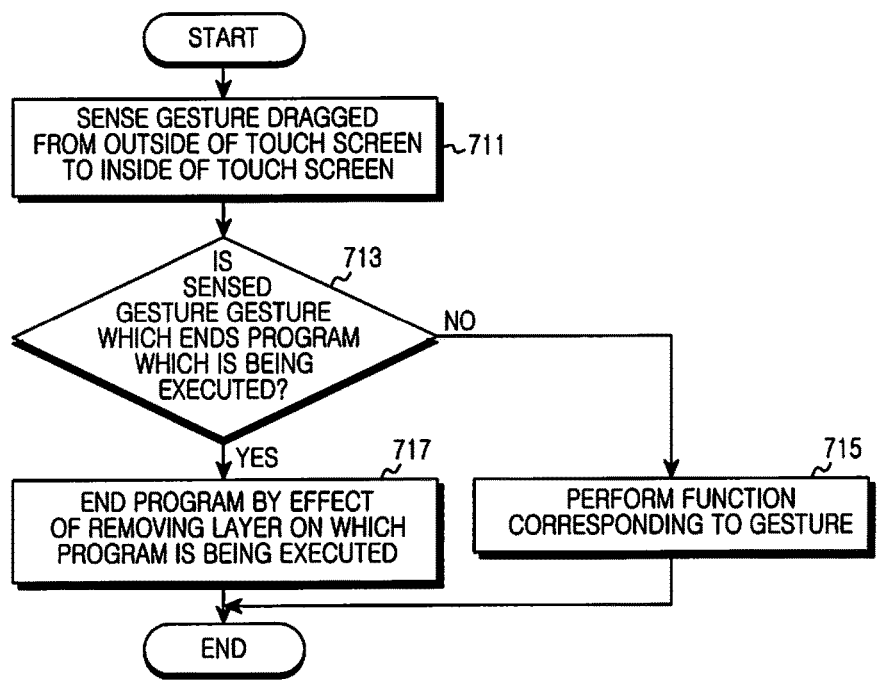

FIGS. 7A and 7B are flowcharts illustrating a process of displaying a layer on a touch screen in an electronic device according to an embodiment of the present invention.

Hereinafter, a description will be given for various embodiments of the present invention with reference to FIGS. 1 and 7A.

In accordance with an embodiment of the present invention, the electronic device 100 determines whether a gesture input to the touch screen 133 is a gesture for performing a control operation to operate a function of the electronic device 100. The electronic device 100 displays its function on a new layer or an old layer displayed on the touch screen 133 according to the determined gesture.

In step 701, the electronic device 100 determines whether a gesture or motion input to the touch screen 133 is an input for performing a control operation to perform a predetermined operation. In accordance with an embodiment of the present invention, the electronic device 100 determines whether the input gesture or motion is an input for calling a program which is different from a program displayed on the touch screen 133 or an input for calling a function of the same program as the program displayed on the touch screen 133. When the input gesture or motion is the input for calling the program which is different from the program displayed on the touch screen 133, the electronic device 100 proceeds to step 703. When the gesture or motion is the input for calling the function of the same program as the program displayed on the touch screen 133, the electronic device 100 proceeds to step 705.

In step 703, the electronic device 100 displays the program which is different from the program displayed on the touch screen 133 on the touch screen 133. When a first program displayed on the touch screen 133 is displayed on a first layer, the electronic device 100 generates a second layer which is different from the first layer displayed on the touch screen 133 and displays the second program on the generated second layer. The electronic device 100 displays the second layer of the displayed second program by an operation of piling up the second layer over the first layer of the first program displayed on the touch screen 133.

In step 705, when the input gesture or motion is not the input for calling the program which is different from the program displayed on the touch screen 133, the electronic device 100 performs an operation corresponding to the input on an old layer displayed on the touch screen 133. In accordance with an embodiment of the present invention, when detecting input for calling a second image when a first image is displayed on a gallery program, the electronic device 100 displays the second image on the same layer as a layer which displays the first image, such as a type of pushing the displayed first image aside. The electronic device 100 may also use a type of releasing the display of the first layer which displays the old first image and displaying the second layer which displays the second image on an area where the first layer is located.

Hereinafter, a description will be given for various embodiments with reference to FIGS. 1 and 7B.

In accordance with an embodiment of the present invention, the electronic device 100 senses whether an input gesture is a gesture dragged in a center direction of the touch screen 133 from a circumferential area of the touch screen 133. The electronic device 100 determines whether the sensed gesture is an operation for releasing display of a layer displayed on the touch screen 133. When the sensed gesture is the operation for releasing the display of the layer displayed on the touch screen 133, the electronic device 100 displays a different layer by releasing display of a layer by an operation of stripping away the layer. When the sensed gesture is not the operation for releasing the display of the layer displayed on the touch screen 133, the electronic device 100 performs a function corresponding to the sensed gesture.

In step 711, the electronic device 100 senses a gesture dragged on the touch screen 133 from the outside of the touch screen 133 among various gestures input to inside of the touch screen 133. In accordance with an embodiment of the present invention, when sensing that the input is started on an outmost circumferential area of the touch screen 133, the electronic device 100 determines that the input is started from the outside of the touch screen 133. Or, when sensing that the input is started from a predetermined position of a circumferential area of the touch screen 133, the electronic device 100 determines that the gesture is a gesture input from the outside of the touch screen 133.

In step 713, the electronic device 100 determines whether the sensed gesture is a gesture for releasing a display of a program displayed on the touch screen 133. In accordance with an embodiment of the present invention, the electronic device 100 determines whether the sensed gesture is a gesture for ending (or releasing the display of) the program displayed on the touch screen 133, that is, determines whether the sensed gesture is included in the same or similar range to an operation of performing a touch on an upper circumferential area of the touch screen 133 and performing a drag and touch release in a lower direction of the touch screen 133 while holding the touch. When the sensed gesture is the gesture for releasing the display of the program displayed on the touch screen 133, the electronic device 100 proceeds to step 717. When the sensed gesture is not the gesture for releasing the display of the program displayed on the touch screen 133, the electronic device 100 proceeds to step 715.

In step 717, the electronic device 100 releases the display of the program displayed on the touch screen 133 according to the sensed gesture. In accordance with an embodiment of the present invention, for releasing the display of the program displayed on the touch screen 133, the electronic device 100 performs an operation for removing a layer which displays the program. The electronic device 100 displays a different layer displayed previously underneath the currently removed layer, which is previously on a top level of the touch screen 133, by removing the layer displayed on the touch screen 133. The electronic device 100 ends the program displayed on the layer removed from the touch screen 133, or temporarily or permanently store information about the removed layer and the program displayed on the removed layer in the memory 110. When permanently storing the information about the layer removed from the touch screen 133 and the program displayed on the removed layer, the electronic device 100 displays the permanently stored information on the touch screen 133 by a predetermined gesture or motion.

In accordance with various embodiments of the present invention, the electronic device 100 determines a predetermined gesture for releasing display of a program displayed on the touch screen 133 to be set as a bezel sweep operation or a different gesture which is started in various directions without being limited to a bezel sweep operation dragged in a lower direction from an upper circumferential area of the touch screen 133.

In step 715, the electronic device 100 performs a function corresponding to the sensed gesture. When a gesture input started from a circumferential area of the touch screen 133 is an operation performed in the same layer such as an operation for scrolling a certain area of the program displayed on a layer, the electronic device 100 performs a corresponding function without releasing display of the layer.

Figure 8:
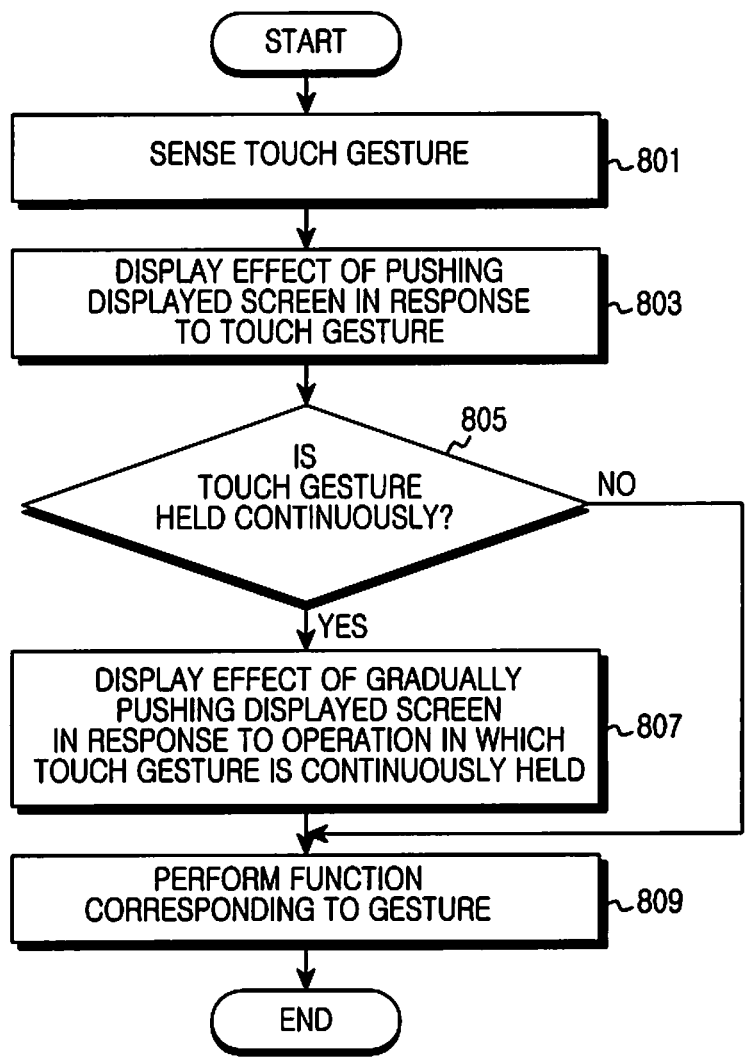
FIG. 8 is a flowchart illustrating a process of controlling a display of a layer on a touch screen in an electronic device according to an embodiment of the present invention.

FIG. 8 is a flowchart illustrating a process of controlling a display of a layer on a touch screen in an electronic device according to an embodiment of the present invention.

In step 801, the electronic device 100 senses an input of a touch gesture of touching a certain region of a layer displayed on the touch screen 133. In accordance with an embodiment of the present invention, the electronic device 100 senses an input of a touch gesture of touching an object displayed on a top layer of the touch screen 133.

In step 803, the electronic device 100 displays an effect of pushing a displayed screen in response to the touch gesture. The electronic device 100 outputs feedback corresponding to touch input on a predetermined area based on a touched position in a layer displayed on the touch screen 133 or the entire layer in which the touch input is sensed. In accordance with an embodiment of the present invention, the electronic device 100 displays an effect of reducing a predetermined region at a predetermined rate based on a touched position by the feedback for the touch input, or displays an effect of reducing the entire layer, in which the touch input is sensed, at a predetermined rate. For displaying the effect, the electronic device 100 applies a moving animation effect and additionally applies a shading effect to the reduced predetermined area or the reduced layer. In accordance with an embodiment of the present invention, for displaying the effect, the electronic device 100 displays an effect of pushing the predetermined area or the layer in which the touch input is sensed.

In step 805, the electronic device 100 determines whether the input touch gesture is held for a predetermined time or longer without being released. When the input touch gesture is held for the predetermined time or longer, the electronic device 100 proceeds to step 807. When the input touch gesture is not held for a predetermined time or longer and when a touch is released, the electronic device 100 proceeds to step 809.

In step 807, when the touch gesture is held for the predetermined time or longer, the electronic device 100 displays an operation for gradually reducing the reduced predetermined region or the layer in which the touch input is sensed in step 803. In accordance with an embodiment of the present invention, when a displayed size of the predetermined area or the layer in which the touch input is sensed is reduced to a size of 95% in response to the touch gesture, and the touch gesture is held for the predetermined time or longer, the electronic device 100 displays an operation for gradually reducing the predetermined area or the layer according to a predetermined rate from the size of 95%. After performing the operation for gradually reducing the predetermined area or the layer, the electronic device 100 proceeds to step 809.

In step 809, the electronic device 100 performs its function corresponding to the gesture input to the touch screen 133. In accordance with an embodiment of the present invention, the electronic device 100 differently sets a function performed therein in response to a touch input which is held for a predetermined time or longer and performs a function corresponding to an input gesture.

The electronic device according to various embodiments of the present invention may obtain a natural change effect of an object displayed on the touch screen by visually displaying feedback matched with a gesture input to the object on the displayed object.

Various embodiments of the present invention may be performed through one or more programs stored in the memory of the electronic device and may be directly controlled by the processor of the electronic device. Also, various embodiments of the present invention may be controlled by one or more control modules controlled by the processor of the electronic device.

Methods according to claims of the present invention and/or embodiments described in the specification of the present invention may be implemented as hardware, software, or a combinational type of the hardware and the software.

When the method is implemented by the software, a computer-readable storage medium for storing one or more programs (software modules) may be provided. The one or more programs stored in the computer-readable storage medium may be executed by one or more processors in the electronic device 100. The one or more programs include instructions for allowing the electronic device 100 to execute the methods according to the claims of the present invention and/or the embodiments described in the specification of the present invention.

These programs (software module, software) may be stored in a Random Access Memory (RAM), a non-volatile memory including a flash memory, a Read Only Memory (ROM), an Electrically Erasable Programmable ROM (EEPROM), a magnetic disc storage device, a Compact Disc-ROM (CD-ROM), a Digital Versatile Disc (DVD) or an optical storage device of a different type, and a magnetic cassette. The programs may also be stored in a memory configured by combination of some or all of them. Also, the configured memory may include a plurality of memories.

Also, the programs may be stored in an attachable storage device which may access the electronic device 100 through each of communication networks such as the Internet, an intranet, a Local Area Network (LAN), a Wide LAN (WLAN), and a Storage Area Network (SAN) or a communication network configured by combination of them. This storage device may connect to the electronic device 100 through an external port.

Also, a separate storage device on a communication network may connect to the portable electronic device 100.

While the present invention has been particularly shown and described with reference to embodiments thereof, it will be understood by those skilled in the art that various changes in form and details may be made therein without departing from the spirit and scope of the present invention as defined by the appended claims and their equivalents.

What is claimed is:

1. A method of an electronic device, the method comprising:
   displaying, via a touch screen of the electronic device, a first screen regarding a first program;
   in response to detecting a touch input on an area within the first screen, displaying the first screen with a first reduced size;
   while detecting that the touch input is maintained on the area, displaying the first screen with a second reduced size changed from the first reduced size, wherein the second reduced size is smaller than the first reduced size and is gradually reduced from the first reduced size according to a time in which the touch input is maintained on the area;
   in response to identifying that the time in which the touch input is maintained on the area reaches a designated time, executing a second program and displaying a second screen regarding the second program overlaid on the first screen regarding the first program;
   in response to receiving a first drag input in a vertical direction from an edge area of the touch screen which is displaying the second screen toward an inside area of the touch screen, restoring the display of the first screen by terminating the second program;
   in response to receiving a second drag input in a horizontal direction on an area within the second screen, executing a third program and displaying a third screen regarding the third program overlaid on the second screen, wherein the third program is designated as being associated with the second program; and
   in response to receiving a third drag input in the vertical direction from the edge area of the touch screen which is displaying the third screen toward the inside area of the touch screen, restoring the display of the second screen by terminating the third program.

2. The method of claim 1, further comprising:
   in response to receiving a fourth drag input in the horizontal direction on an area within the third screen, displaying another screen regarding the third program overlaid on the second screen, and
   in response to receiving a fifth drag input in the vertical direction from the edge area of the touch screen which is displaying the another screen toward the inside area of the touch screen, restoring the display of the second screen by terminating the third program.

3. The method of claim 1,
   wherein displaying the second screen overlaid on the first screen comprises displaying at least a portion of the second screen that gradually covers the first screen and displaying at least a portion of the first screen that is covered by the second screen, and
   wherein the first screen is being gradually enlarged from the second reduced size while the at least a portion of the first screen is being displayed.

4. The method of claim 1, wherein displaying the first screen with the first reduced size comprises shading the first screen.

5. The method of claim 1,
   wherein the touch input on the area within the first screen comprises a touch input for selecting an object displayed in the first screen, and
   wherein the second program is associated with the object.

6. The method of claim 1,
   wherein information regarding the first screen is stored in a memory of the electronic device while the second screen is being displayed.

7. An electronic device comprising:
   a touch screen;
   a memory; and
   at least one processor coupled to the touch screen and the memory;
   wherein the at least one processor is configured to:
      display, via the touch screen, a first screen regarding a first program,
      in response to detecting a touch input on an area within the first screen, display the first screen with a first reduced size,
      while detecting that the touch input is maintained on the area, display the first screen with a second reduced size changed from the first reduced size, wherein the second reduced size is smaller than the first reduced size and is gradually reduced from the first reduced size according to a time in which the touch input is maintained on the area,
      in response to identifying that the time in which the touch input is maintained on the area reaches a designated time, execute a second program and display a second screen regarding the second program overlaid on the first screen regarding the first program,
      in response to receiving a first drag input in a vertical direction from an edge area of the touch screen which is displaying the second screen toward an inside area of the touch screen, restore the display of the first screen by terminating the second program,
      in response to receiving a second drag input in a horizontal direction on an area within the second screen, execute a third program and display a third screen regarding the third program overlaid on the second screen, wherein the third program is designated as being associated with the second program, and
      in response to receiving a third drag input in the vertical direction from the edge area of the touch screen which is displaying the third screen toward the inside area of the touch screen, restore the display of the second screen by terminating the third program.

8. The electronic device of claim 7,
   wherein the at least one processor is further configured to:
   in response to receiving a fourth drag input in the horizontal direction on an area within the third screen, display another screen regarding the third program overlaid on the second screen, and
   in response to receiving a fifth drag input in the vertical direction from the edge area of the touch screen which is displaying the another screen toward the inside area of the touch screen, restore the display of the second screen by terminating the third program.

9. The electronic device of claim 7,
   wherein the at least one processor is further configured to:

in response to identifying that the time in which the touch input is maintained on the area reaches a designated time, execute the second program, display at least a portion of the second screen that gradually covers the first screen, and display at least a portion of the first screen that is covered by the second screen, and wherein the first screen is being gradually enlarged from the second reduced size while the at least a portion of the first screen is being displayed.

10. The electronic device of claim 7, wherein the at least one processor is further configured to, in response to detecting the touch input on the area within the first screen, display the first screen with the first reduced size and shade the first screen.

11. The electronic device of claim 7, wherein the touch input on the area within the first screen comprises a touch input for selecting an object displayed in the first screen, and wherein the second program is associated with the object.

12. The electronic device of claim 7, wherein information regarding the first screen is stored in the memory of the electronic device while the second screen is being displayed.

* * * * *